US012403668B2

(12) United States Patent
Overstreet et al.

(10) Patent No.: US 12,403,668 B2
(45) Date of Patent: Sep. 2, 2025

(54) VERTICAL REFUSE BALER

(71) Applicant: Marathon Equipment Company, South Vernon, AL (US)

(72) Inventors: Daniel Robert Overstreet, Caledonia, MS (US); Lokesh Krishna, Bangalore (IN); Ravi Khanapure, Bangalore (IN)

(73) Assignee: Marathon Equipment Company, South Vernon (AL)

( * ) Notice: Subject to any disclaimer, the term of this patent is extended or adjusted under 35 U.S.C. 154(b) by 260 days.

(21) Appl. No.: 18/151,049

(22) Filed: Jan. 6, 2023

(65) Prior Publication Data

US 2023/0219317 A1 Jul. 13, 2023

Related U.S. Application Data

(60) Provisional application No. 63/298,029, filed on Jan. 10, 2022.

(51) Int. Cl.
*B30B 9/30* (2006.01)
*B30B 15/00* (2006.01)
*B30B 15/14* (2006.01)
*B30B 15/32* (2006.01)

(52) U.S. Cl.
CPC .......... *B30B 9/3007* (2013.01); *B30B 9/3014* (2013.01); *B30B 9/3032* (2013.01); *B30B 9/306* (2013.01); *B30B 15/0094* (2013.01); *B30B 15/148* (2013.01); *B30B 15/32* (2013.01)

(58) Field of Classification Search
CPC ... B30B 9/3007; B30B 9/3014; B30B 9/3032; B30B 9/306; B30B 15/0094; B30B 15/148; B30B 15/281; B30B 15/32
See application file for complete search history.

(56) References Cited

U.S. PATENT DOCUMENTS 3,353,478 A 11/1967 Hopkins
3,669,010 A 6/1972 Lundgren
3,714,890 A 2/1973 Moon
3,868,903 A 3/1975 Montalbano
(Continued)

FOREIGN PATENT DOCUMENTS

AU 2000064442 8/2000
CN 208712495 4/2019
(Continued)

OTHER PUBLICATIONS

[No Author Listed], "Blokpak—100 HP—Weighing System for Solid Waste Systems, Blackfoot, ID," Marathon Equipment Company, Dwg. No. 57467, Jun. 18, 2002, 1 page.
(Continued)

*Primary Examiner* — Jimmy T Nguyen
(74) *Attorney, Agent, or Firm* — Fish & Richardson P.C.

(57) ABSTRACT

A vertical baler includes a frame defining a compaction chamber, a platen configured for vertical travel within the compaction chamber to compact refuse contained within the compaction chamber, a linear actuator coupled to the platen and configured to raise and lower the platen within the compaction chamber, an electric motor coupled to the linear actuator and configured to control extension and retraction of the linear actuator, an encoder coupled to the electric motor and configured to measure rotation of the motor, and one or more processors.

7 Claims, 15 Drawing Sheets

(56) References Cited

U.S. PATENT DOCUMENTS

| | | | |
|---|---|---|---|
| 3,901,541 A | 8/1975 | Peterson | |
| 4,232,599 A | 11/1980 | Ulrich | |
| 4,643,087 A | 2/1987 | Fenner et al. | |
| 4,773,027 A | 9/1988 | Neumann | |
| 5,016,197 A | 5/1991 | Neumann et al. | |
| 5,044,271 A | 9/1991 | Robbins et al. | |
| 5,117,373 A | 5/1992 | Huff | |
| 5,173,866 A | 12/1992 | Neumann et al. | |
| 5,247,880 A | 9/1993 | Robbins | |
| 5,299,142 A | 3/1994 | Brown et al. | |
| 5,299,493 A | 4/1994 | Durbin et al. | |
| 5,303,642 A | 4/1994 | Durbin et al. | |
| 5,353,698 A | 10/1994 | Robbins | |
| 5,456,118 A | 10/1995 | Hines et al. | |
| 5,514,338 A | 5/1996 | Simon et al. | |
| 6,003,441 A | 12/1999 | Little | |
| 6,055,902 A | 5/2000 | Harrop et al. | |
| 6,360,186 B1 | 3/2002 | Durbin | |
| 6,408,261 B1 | 6/2002 | Durbin | |
| 6,418,841 B1 | 7/2002 | Little et al. | |
| 6,453,270 B1 | 9/2002 | Durbin | |
| 6,561,085 B1 | 5/2003 | Durbin et al. | |
| 6,738,732 B2 | 5/2004 | Durbin et al. | |
| 6,742,448 B1 | 6/2004 | Davis et al. | |
| 7,124,680 B2 | 10/2006 | Poss et al. | |
| 7,146,294 B1 | 12/2006 | Waitkus, Jr. | |
| 7,389,724 B2 | 6/2008 | Seagraves et al. | |
| 7,690,296 B2 | 4/2010 | Seagraves et al. | |
| 7,926,419 B1 | 4/2011 | Simon et al. | |
| 8,371,213 B2 | 2/2013 | Correale, Jr. et al. | |
| 8,371,214 B1 | 2/2013 | Correale, Jr. | |
| 8,794,135 B1 | 8/2014 | Simon et al. | |
| 9,193,126 B2 | 11/2015 | Correale, Jr. | |
| 9,770,878 B2 | 9/2017 | Correale, Jr. | |
| 10,377,518 B2 | 8/2019 | Waite et al. | |
| 10,564,029 B2 | 2/2020 | Waite et al. | |
| 2005/0275556 A1* | 12/2005 | Brown | B30B 9/3007 340/531 |
| 2013/0319264 A1* | 12/2013 | McLaughlin | B30B 15/281 100/215 |
| 2016/0023417 A1* | 1/2016 | Hanson | B30B 9/301 100/99 |
| 2019/0224935 A1 | 7/2019 | Waite et al. | |
| 2019/0293478 A1 | 9/2019 | Waite et al. | |
| 2020/0016608 A1 | 1/2020 | Iizuka et al. | |
| 2020/0164608 A1 | 5/2020 | Waite et al. | |

FOREIGN PATENT DOCUMENTS

| | | |
|---|---|---|
| CN | 108995274 | 5/2021 |
| CN | 108772407 | 1/2024 |
| DE | 2225937 | 12/1972 |
| DE | 2410265 | 9/1974 |
| DE | 2437993 | 8/1976 |
| DE | 2704787 | 8/1977 |
| DE | 2337663 | 12/1986 |
| DE | 20022902 | 8/2002 |
| DE | 202010007347 | 9/2010 |
| ES | 2156747 | 2/2002 |
| FR | 2154613 | 4/1977 |
| FR | 2340198 | 10/1979 |
| FR | 2698024 | 5/1994 |
| FR | 2788467 | 2/2001 |
| GB | 1015287 | 12/1965 |
| GB | 1361959 | 7/1974 |
| JP | 1984-130699 | 7/1984 |
| JP | 1996-187599 | 7/1996 |
| KR | 200413636 | 4/2006 |
| KR | 10-2009-0017520 | 2/2009 |
| UA | 111170 | 4/2016 |
| WO | WO 1999/033644 | 7/1999 |
| WO | WO 1999/039899 | 8/1999 |
| WO | WO 2001/010748 | 2/2001 |
| WO | WO 2002/062565 | 8/2002 |
| WO | WO 2019/123404 | 6/2019 |

OTHER PUBLICATIONS

[No Author Listed], "Foundation Layout BT-2410-90-FESD-SL-U 24'x 10' Steel Deck Ultra Low Track Scale 90,000# Capacity 60,000# CLC," Southwestern Scale Company Inc., Dwg. No. MFG14979-1, Jun. 22, 2020, 1 page.

ActiveScale.com [online], "Hopper Scales," available on or before Mar. 15, 2019, via Internet Archive: Wayback Machine URL <http://web.archive.org/web/20190315092058/http://activescale.com/products/other-scales/hopper-scales/>, retrieved on Aug. 3, 2023, URL <http://activescale.com/products/other-scales/hopper-scales/>, 4 pages.

avaicg.com [online], "Complete and Reliable Equipment Solutions." available on or before Jul. 24, 2021, via Internet Archive: Wayback Machine URL <http://web.archive.org/web/20210724111245/https://avaicg.com/equipment/>, retrieved on Sep. 1, 2023, URL <https://www.avaicg.com/equipment>, 3 pages.

Cram-A-Lot.com [online], "Equipment," available on or before Mar. 7, 2021, via Internet Archive: Wayback Machine URL <http://web.archive.org/web/20210307235005/https://www.cram-a-lot.com/equipment>, retrieved on Aug. 3, 2023, URL <https://www.cram-a-lot.com/equipment>, 18 pages.

Cram-A-Lot.com [online], "VB Balers," 2004, retrieved on Aug. 3, 2023, retrieved from URL <https://www.cram-a-lot.com/vb-balers>, 2 pages.

Galfab.com [online], "Compactors & Balers," available on or before Apr. 12, 2021, via Internet Archive: Wayback Machine URL <http://web.archive.org/web/20210412225943/https://www.galfab.com/products/compactors-balers/>, retrieved on Aug. 3, 2023, URL <https://www.galfab.com/products/compactors-balers/>, 2 pages.

Harmony1.com [online], "Compactors," available on or before Jan. 15, 2021, via Internet Archive: Wayback Machine URL <http://web.archive.org/web/20210115213914/https://harmony1.com/productcategory/compactors/>, retrieved on Aug. 3, 2023, URL <https://harmony1.com/productcategory/compactors/>, 4 pages.

Harmony1.com [online], "Insite Technology," available on or before Jun. 25, 2021, via Internet Archive: Wayback Machine URL <http://web.archive.org/web/20210625050426/https://harmony1.com/insite-technology/>, retrieved on Aug. 7, 2023, URL <https://harmony1.com/insite-technology/>, 6 pages.

Harmony1.com [online], "Vertical Balers," available on or before Sep. 26, 2021, via Internet Archive: Wayback Machine URL <http://web.archive.org/web/20210926064648/https://harmony1.com/productcategory/vertical-balers/>, retrieved on Aug. 3, 2023, URL <https://harmony1.com/productcategory/vertical-balers/>, 11 pages.

HunkelerSysteme.com [online], "Weighing for compactors," available on or before Jan. 24, 2021, via Internet Archive: Wayback Machine URL <http://web.archive.org/web/20210124144214/https://www.hunkelersysteme.com/en/products/weighing-systems-presscontainer/>, retrieved on Aug. 7, 2023, URL <https://www.hunkelersysteme.com/en/products/weighing-systems-presscontainer/>, 1 page.

Loadman.com [online], "Roll-Off and Hook Lift On-Board Truck Scales," available on or before Feb. 6, 2018, via Internet Archive: Wayback Machine URL <http://web.archive.org/web/20180206132702/https://www.loadman.com/products/on-board-truck-scales/roll-off-hook-scales/>, retrieved on Aug. 3, 2023, URL <https://www.loadman.com/products/on-board-truck-scales/roll-off-hook-scales/>, 4 pages.

Marathon Equipment Company, "High-Volume transfer systems," Brochure, 2013, 4 pages.

Marathon Equipment Company, "TrashMinder: Pager-Alert Fullness Unit Model 100P," 1996, 1 page.

MarathonEquipment.com [online], "BlokPak 3000 Transfer System," Marathon Equipment Company, MP-3M-11/2004, available on or before May 10, 2006, retrieved from URL <https://web.archive.org/web/20060510005725/http:/www.marathonequipment.com/Lit/BlokPak.pdf>, 2 pages.

(56) References Cited

OTHER PUBLICATIONS

MarathonEquipment.com [online], “Heavy-Duty Vertical Balers,” available on or before Jan. 25, 2022, via Internet Archive: Wayback Machine URL <http://web.archive.org/web/20220125085104/https://www.marathonequipment.com/product-type/heavy-duty-vertical-balers-recycling-balers-compactors/>, retrieved Aug. 3, 2023, URL <https://www.marathonequipment.com/product-type/heavy-duty-vertical-balers-recycling-balers-compactors/>, 9 pages.

Orwak, “Option Orwak Connect: Benefit Even More from Your New Orwak Baler—Let it Communicate!” Jan. 2021, 2 pages.

PTR Balers & Compactor Company, “Self-Contained Compactors,” Nov. 2017, 1 page.

PTRCo.com [online], “Full Line of Balers,” available on or before Mar. 3, 2021, via Internet Archive: Wayback Machine URL <http://web.archive.org/web/20210303150607/https://ptrco.com/vertical_balers_standard_models_ptr/>, retrieved Aug. 3, 2023, URL <https://ptrco.com/vertical_balers_standard_models_ptr/>, 5 pages.

PTRCo.com [online], “Full Line of Compactors,” 2016, retrieved on Aug. 3, 2023, retrieved from URL <https://ptrco.com/compactors/>, 21 pages.

PTRCo.com [online], “PTR Smart Vertical Baler,” available on or before Sep. 20, 2020, via Internet Archive: Wayback Machine URL <http://web.archive.org/web/20200920141400/https://ptrco.com/the-smart-baler/>, retrieved on Sep. 1, 2023, URL <https://ptrco.com/the-smart-baler/>, 5 pages.

PTRCo.com [online], “Zero In on Total Accuracy,” available on or before Jun. 15, 2021, via Internet Archive: Wayback Machine URL <http://web.archive.org/web/20210615125428/https://ptrco.com/zero-in-on-total-accuracy/>, retrieved on Sep. 1, 2023, URL <https://ptrco.com/zero-in-on-total-accuracy/>, 5 pages.

SebrightProducts.com [online], “Compactors,” available on or before May 22, 2022, via Internet Archive: Wayback Machine URL <http://web.archive.org/web/20220522174849/https://www.sebrightproducts.com/compactors/>, retrieved Aug. 3, 2023, URL <https://www.sebrightproducts.com/compactors/>, 3 pages.

SWScale.com [online], “Roll Off Bin Scales,” available on or before Jul. 2021, retrieved on Aug. 3, 2023, retrieved from URL <https://swscale.com/products/industrial-scales/roll-off-bin-scales/>, 3 pages.

* cited by examiner

VERTICAL REFUSE BALER

CROSS-REFERENCE TO RELATED APPLICATIONS

This application claims priority under 35 U.S.C. § 119(e) to U.S. Provisional Application No. 63/298,029, filed Jan. 10, 2022. The contents of this application is hereby incorporated by reference in its entirety.

TECHNICAL FIELD

This disclosure generally relates to compactor devices, and more particularly to vertical balers configured to compress waste materials.

BACKGROUND

Various compactor devices (e.g., balers) for compacting waste materials (e.g., refuse such as cardboard, paperboard, or the like) exist in the art. These compactor devices generally include a housing defining a compaction chamber, a closable door, and a compacting device (e.g., a hydraulically-powered ram) that is actuated to perform a compaction cycle in the compaction chamber. While existing compactor devices can be effective, these compactor devices provide no control over the duration and/or actuation of the compaction cycle. Furthermore, the weight of each finished refuse bale is typically measured manually, which can lead to decreased efficiency. In addition, the current compactor devices do not provide operating and/or safety indications to the operators.

SUMMARY

In general, this disclosure relates to vertical balers that can include one or more of an electrical linear drive system, a weighing system, and a laser projection system.

One aspect of the present disclosure features a vertical baler including a frame defining a compaction chamber; a platen configured for vertical travel within the compaction chamber to compact refuse contained within the compaction chamber; a linear actuator coupled to the platen and configured to raise and lower the platen within the compaction chamber; an electric motor coupled to the linear actuator and configured to control extension and retraction of the linear actuator; an encoder coupled to the electric motor and configured to measure rotation of the motor; and one or more processors configured to perform operations including: receiving, from the encoder, data indicating rotations of the electric motor; determining, based on the data indicating rotations of the electric motor, a position of the platen within the compaction chamber; receiving data indicating an amount of amperage being drawn by the electric motor; and determining, based on the data received from the encoder, that the position of the platen within the compaction chamber corresponds to a threshold position; determining that the amount of amperage being drawn by the electric motor corresponds to a threshold amperage; and in response to determining that the position of the platen within the compaction chamber corresponds to the threshold position and the amperage being drawn by the electric motor corresponds to the threshold amperage, causing a refuse bale to be ejected from the compaction chamber.

Embodiments may include one or more of the following features.

In some embodiments, the operations further include raising the platen to a home position within the compaction chamber in response to determining that the position of the platen within the compaction chamber corresponds to the threshold position and the amperage being drawn by the electric motor corresponds to the threshold amperage.

In some embodiments, raising the platen to a home position within the compaction chamber includes retracting the linear actuator.

In some embodiments, the vertical baler further includes a bale door coupled to the frame; and causing a refuse bale to be ejected from the compaction chamber includes controlling the bale door to be positioned in an open position.

In some embodiments, the operations further include: in response to determining that (i) the position of the platen within the compaction chamber corresponds to the threshold position and (ii) the amperage being drawn by the electric motor corresponds to the threshold amperage, causing an indicator on the vertical baler to indicate that a refuse bale has been generated.

In some embodiments, the operations further include determining, based on the data indicating the amount of amperage being drawn by the electric motor, that the amperage being drawn by the electric motor has increased by a predetermined amount over a predetermined amount of time; and in response, controlling the electric motor to reduce a speed of travel of the platen within the compaction chamber in response to determining that the amperage being drawn by the electric motor has increased by the predetermined amount over the predetermined amount of time.

In some embodiments, the vertical baler further includes a variable frequency drive coupled to the linear actuator and configured to control a speed of movement of the platen within the compaction chamber; and reducing the speed of travel of the platen within the compaction chamber includes causing the variable frequency drive to reduce a rate of extension of the linear actuator.

Another aspect of the present disclosure features a vertical baler including a frame defining a compaction chamber; a platen configured for vertical travel within the compaction chamber to compact refuse contained within the compaction chamber; a floating bed movably coupled to the frame and configured to receive refuse provided to the compaction chamber; and at least one load cell coupled to a floor of the compaction chamber, the load cell being configured to measure a force applied to the floating bed.

In some embodiments, the frame defines one or more channels extending along a base of the frame; the load cell is coupled to the base of the frame within a channel of the one or more channels; and the floating bed is positioned on and supported by the load cell.

In some embodiments, placement of refuse on the floating bed causes the floating bed to lower within the frame and apply a force to the load cell.

In some embodiments, the load cell is configured to measure a total force applied to the floating bed; and the vertical baler includes one or more processors configured to perform operations including: receiving data from the load cell indicating a total force applied to the floating bed; and determining, based on the data received from the load cell indicating a total force applied to the floating bed, a weight of refuse positioned on the floating bed.

In some embodiments, determining, based on the data received from the load cell, the weight of refuse positioned on the floating bed includes: receiving, by the one or more processors, data indicating an amount of force being applied by the platen; and calculating, by the one or more processors, a difference between the total force applied to the floating bed and the amount of force being applied by the platen.

In some embodiments, the vertical baler includes a weight indicator; and the operations further include causing the weight indicator to display at least one of the weight of refuse positioned on the floating bed or the amount of force being applied by the platen.

In some embodiments, the vertical baler further includes a spring coupled to the floating bed and positioned between the floating bed and the load cell.

In some embodiments, the spring is configured to compress during compression of refuse on the floating bed by the platen.

In some embodiments, the vertical baler further includes a mechanical stop coupled to a base of the frame and configured to prevent damage to the load cell.

In some embodiments, the vertical baler includes one or more processors configured to perform operations including: receiving a signal from the load cell indicating an amount of force being applied to the load cell by the spring, the amount of force being applied to the load cell by the spring corresponding to a weight of refuse positioned on the floating bed.

In some embodiments, the vertical baler includes a weight indicator; and the operations further include causing the weight indicator to display the weight of refuse positioned on the floating bed.

Yet another aspect of the present disclosure features a vertical baler, including: a frame defining a compaction chamber; a door mounted on the frame, the door covering at least a portion of the compaction chamber when in a closed position; and a laser projection system coupled to the frame, the laser projection system configured to project a visual indicator onto a surface proximate the vertical baler when the door is in an open position.

In some embodiments, the vertical baler further includes one or more processors configured to cause the laser projection system to project the visual indicator onto the surface proximate the vertical baler when the door is in the open position.

In some embodiments, the vertical baler further incudes a limit switch communicably coupled to the one or more processors and configured to detect when the door is in the open position; and the one or more processors are configured to cause the laser projection system to project the visual indicator onto the surface proximate the vertical baler in response to receiving a signal from the limit switch indicating that the door is in the open position.

In some embodiments, the vertical baler further includes a motion sensor configured to detect a presence of a person within a threshold distance of the door; and the one or more processors are configured to cause the laser projection system to project the visual indicator onto the surface proximate the vertical baler in response to determining that the door is in the open position and receiving a signal from the motion sensor indicating that a person is within the threshold distance of the door.

In some embodiments, the laser projection system is configured to project a curved beam onto the surface proximate the vertical baler indicating a path of the door between the open position and the closed position.

In some embodiments, the laser projection system is configured to project a hazard logo onto the surface proximate the vertical baler.

In some embodiments, the laser projection system is configured to project a rectangular shape on the surface proximate the vertical baler corresponding to a proper position for placing a pallet to receive a refuse bale being ejected from the compaction chamber.

In some embodiments, the laser projection system is configured to project a pallet logo within the rectangular shape.

In some embodiments, the laser projection system is configured to project one or more lines outside the rectangular shape, the one or more lines indicating a clear area.

In some embodiments, the laser projection system is configured to project one or more colors to indicate one or more hazard warnings.

In some embodiments, wherein the laser projection system includes one or more lasers.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
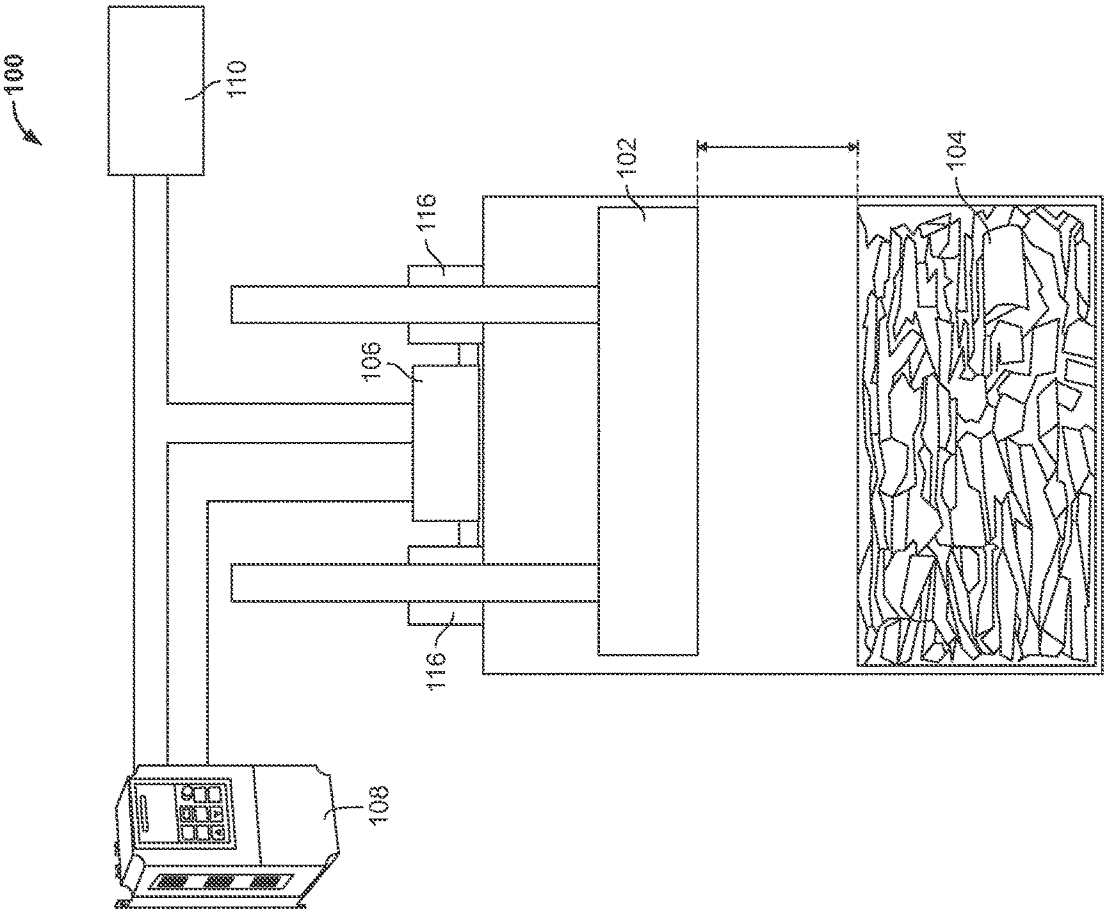
FIG. 1 is a schematic diagram depicting a vertical baler including an electrical linear drive system.

Embodiments described below include compactor devices (e.g., vertical balers) featuring electrical linear drive systems, weighing systems, and laser projection systems. These embodiments use a linear actuator and an encoder operatively connected to an electric motor to provide control of and further optimize compaction cycles. In some embodiments, the vertical balers provided herein include a weighing system that is configured to measure a weight of a refuse bale. In some embodiments, the vertical balers provided herein include a laser projection system that is configured to project one or more visual indicators that provide safety guidance to the user.

Compaction cycles in some compactor devices typically do not provide control over platen travel except when manually actuated to begin and/or end a cycle. For example, current compactor devices fail to detect platen travel and/or position, much less offer control of a movement of the platen (e.g., more than one speed of platen travel) during and/or before or after compaction. Current compaction devices are limited to setting their platen to travel at a maximum speed when compacting the refuse material (e.g., cardboards, plastics, etc.). As a result, during compaction, the platen may experience impact/dynamic load, which can lead to complex stress depending on nature of loading conditions. This may cause severe strength reductions and/or damage to the system components system, as well as accelerated wear and tear of mechanical parts due to rapid acceleration/deceleration. One advantage of the embodiments described below is that they provide control of platen travel at any operational position. Furthermore, the embodiments described below provide identification of bale fullness as determined by electric motor performance (e.g., amperage drawn by the electric motor) and platen position detection. As a result, the embodiments described below may improve the efficiency of compaction cycles and refuse bale generation compared to conventional compaction devices, where compaction cycles are not able to be optimized and/or automatically controlled. Moreover, the embodiments described below may also reduce or eliminate strength reductions and/or damage to the system components system and may reduce the progression of wear and tear of mechanical parts.

The embodiments described below further provide automatic measurement of a weight of a refuse bale while in the compaction chamber. For example, the embodiments described below feature a floating bed and one or more load cells that are configured to measure and/or record a refuse bale weight in real time or periodically at specific intervals or after certain triggering events, including at the end of the baling process. As a result, the embodiments below may reduce the time required to manually measure a weight of a refuse bale, which typically involves handling the waste material, thereby improving efficiency of the baling process.

Furthermore, the embodiments described below provide automatic generation of visual indicators to improve safety of the user. For example, the embodiments described below provide example visual indicators that indicate, in real time: the placement location of a pallet during refuse bale loading, location of safety areas such as walkways, and hazard indicators during baler operation. Thus, the embodiments, below may improve safety of the user by providing visual indicators that clearly convey safety guidelines to the user in real time compared to conventional methods that rely on decals and tapelines and paperwork instructions that are not generated in real time.

FIG. 1 is a simplified schematic diagram of an example vertical baler 100 including an electrical linear drive system. The vertical baler includes a platen 102 that is configured to compact refuse 104. The electrical linear drive system detects and controls the movement of the platen 102 and includes components such as an electric motor 106, a variable frequency drive 108, an encoder 110, and a pair of linear actuators 116. The electrical linear drive system can optimize cycle time and travel of the platen 102 and further includes one or more processors.

Figure 2:
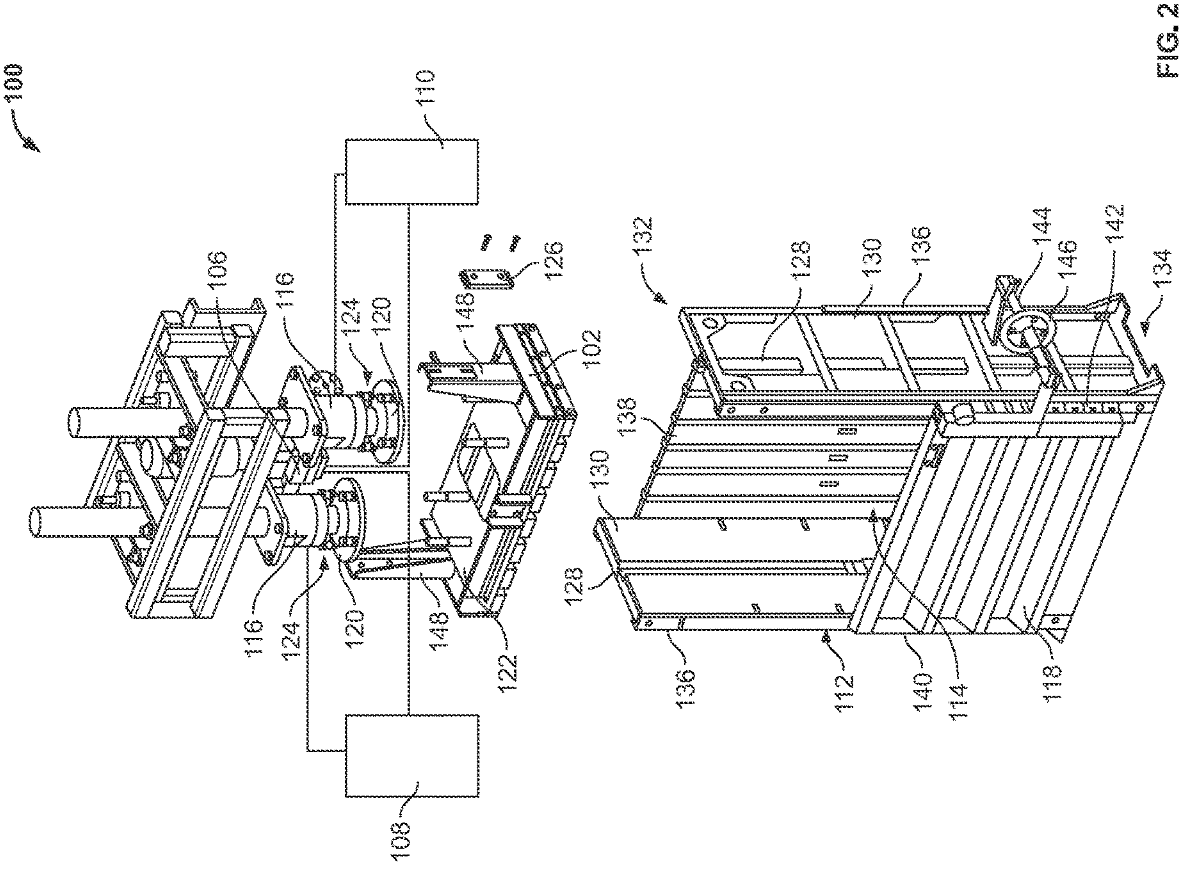
FIG. 2 is a partial exploded perspective view of a vertical baler including an electrical linear drive system.

Referring to FIG. 2, the vertical baler 100 includes a frame 112 having a back wall 138 extending orthogonally between a pair of opposing side walls 136. The vertical baler 100 further includes a bale door 118 having a first edge 140 that is pivotably coupled to the frame 112 via a hinge and a second edge 142 that is hingedly coupled to the frame 112 by a turnbuckle latch 144. A user can open and close the turnbuckle latch 144, and consequently unlock and lock the bale door 118, by rotating a wheel 146. The back wall 138, opposing side walls 136, and the bale door (when in a closed position) together define a compaction chamber 114. The platen 102 is configured for vertical travel, between the first end 132 and the second end 134 of the vertical baler 100, within the compaction chamber 114, to compact refuse contained within the compaction chamber 114.

The components of the electrical linear drive system are coupled to the vertical baler 100 via a specialized mounting flange and a platen design that includes a track-and-guide system. For example, as shown in FIG. 2, the linear actuators 116 are coupled to the platen 102. Each linear actuator 116 includes a flange 120 disposed at a distal end 124 that is proximal to a surface 122 of the platen 102. The flange 120 is coupled (e.g., fastened with a fastener such as, but not limited to, a bolt, a threaded fastener, a clevis fastener, or the like) to the surface 122 of the platen 102.

The vertical baler 100 further includes a track-and-guide system to guide vertical travel of the platen 102 and the electrical linear drive system components within the compaction chamber 114. The track-and-guide system includes a pair of guide bars 126 and a pair of tracks 128. Each guide bar 126 is coupled (e.g., fastened with any suitable fastener) to a pair of opposing side plates 148 extending vertically and orthogonally from the surface 122 of the platen 102. The side plates 148 are fixedly coupled (e.g., welded, forged, or the like) to the surface 122 of the platen 102. A side panel 130 is coupled to each of the pair of opposing side walls 136 and extends vertically from a first end 132 to a second end 134 along the height of the vertical baler 100. The guide bars 126 are each configured to slideably couple with a track 150 defined by each side panel 130.

The tracks 150 extend vertically from the first end 132 to the second end 134 of the vertical baler 100. The tracks 150 have a C- or U-shape that mateably engages the guide bars 126. Thus, the guide bars 126 are configured to slide linearly within the tracks 150 in a substantially frictionless manner. At least the inner surfaces of the track 150 and the surfaces of the guide bars 126 can be composed of a durable material having a low coefficient of friction. The coefficient of friction is sufficiently low to permit the guide bars 126 to easily slide on the tracks 150 during vertical travel of the platen 102. Example materials from which the guide bars 126 may be made include high density polyethylene.

The linear actuators 116 are further operatively coupled to the electric motor 106 and are configured to raise and lower the platen 102 within the compaction chamber 114. The electric motor 106, in turn, is configured to control the extension and retraction of the linear actuators. 116. The electric motor 106 and linear actuators 116 are operatively connected to an encoder 110. The encoder 110 is a sensor that can be mounted on the rotor shaft of the electric motor 106 and is configured to measure and/or record at least one of: rotation of the electric motor 106, rotor position of the electric motor 106, and speed of the electric motor 106. The electric motor 106 and linear actuators 116 are also operatively connected to a variable frequency drive (VFD) 108. The VFD 108 is a type of motor drive that supplies a frequency to the electric motor 106 and is configured to control one or more of: the speed, torque, acceleration, deceleration, and direction of rotation of the electric motor 106 by adjusting the supplied frequency and/or voltage. The VFD 108, consequently, can one or more of: speed, acceleration, and deceleration of a movement of the platen 102 within the compaction chamber 114. In addition, the variable frequency drive 108 can enable the manual and/or automatic selection of any number of electric motor speeds within its operating range.

Figure 3:
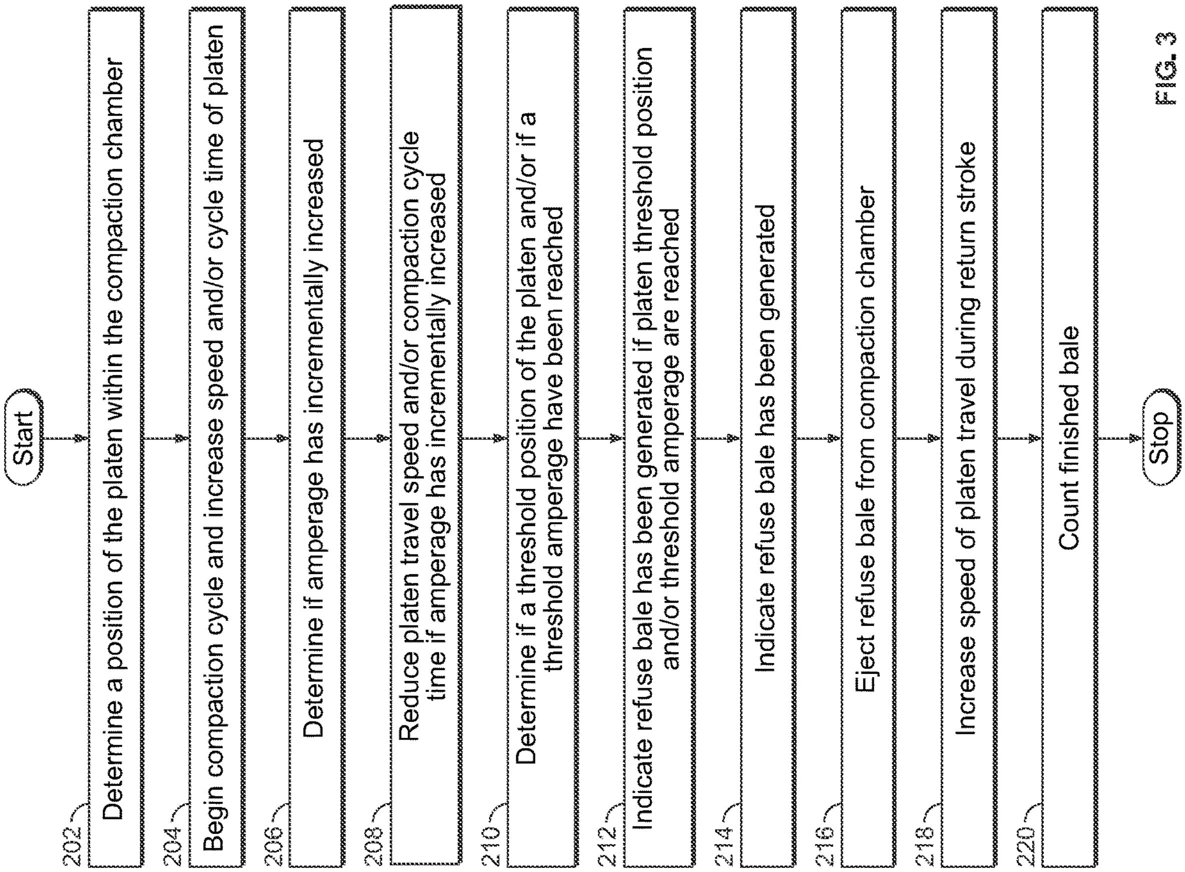
FIG. 3 is a flow chart illustrating method steps for detecting and controlling platen travel.

The electrical linear drive system further includes one or more processors that are configured to perform certain operations. FIG. 3 is a flow chart illustrating a method of detecting and controlling platen travel using the one or more processors. The one or more processors are configured to receive from the encoder, data indicating rotations of the electric motor. The method includes a step 202 in which the one or more processors are configured to determine, based on the data indicating rotations of the electric motor, a position of the platen within the compaction chamber. For example, before starting a compaction cycle, the one or more processors determines a position of the platen and verifies the platen is at a home position. The home position is defined as a position of the platen 102 that is proximal to the first end 132 of the vertical baler 100 within the compaction chamber 114 when the linear actuators 116 are in a fully retracted position. A user can empty refuse into the compaction chamber 114 while the platen is in the home position. The method includes a step 204 where the user starts a compaction cycle (e.g., by activating a switch that relays the instruction to start a cycle to the one or more processors), the one or more processors send instructions to the VFD to increase the speed and/or cycle time of platen travel, and the platen begins to move down starting from the home position. The speed and/or cycle time of platen travel can continue to increase during the forward stroke at a non-compaction stage (e.g., when the platen is traveling through air and not compacting any refuse).

The one or more processors are further configured to receive data indicating an amount of amperage being drawn by the electric motor. The method includes a step 206 in which the one or more processors are configured to determine, based on the data received from the encoder, that the amount of amperage being drawn by the electric motor has incrementally increased compared to an initial amperage drawn. For example, the one or more processors are configured to determine, based on the data indicating the amount of amperage being drawn by the electric motor, that the amperage being drawn by the electric motor has increased by a predetermined amount over a predetermined amount of time as compared to the initial amperage drawn by the electric motor (e.g., the initial amperage drawn during the forward stroke at the non-compaction stage).

If the one or more processors determine that the amount of amperage being drawn by the electric motor has incrementally increased compared to the initial amperage, then the one or more processors send instructions to the VFD to reduce platen travel speed and/or compaction cycle time, as illustrated in step 208. For example, the one or more processors are configured to in response, control the electric motor to reduce a speed of travel of the platen within the compaction chamber in response to determining that the amperage being drawn by the electric motor has increased by the predetermined amount over the predetermined amount of time as compared to the initial amperage drawn. The one or more processors cause the variable frequency drive to, for example, reduce a rate of extension of the linear actuator in order to reduce the speed of travel of the platen within the compaction chamber. In some embodiments, the one or more processors is a programmable logic controller (PLC). In some embodiments, the one or more processors are configured to, in response to determining that the amount of amperage being drawn by the electric motor has increased, control the electric motor to reduce the set speed of travel of the platen (e.g., as the platen returns to its home position and/or as it approaches its fully extended position).

If the one or more processors determine that the amount of amperage being drawn by the electric motor has not incrementally increased, then the platen travel continues at the set speed (e.g., the acceleration of the platen remains the same). In some embodiments, the one or more processors are configured to, in response to determining that the amount of amperage being drawn by the electric motor has not changed (e.g., has stayed the same), control the electric motor to maintain the set speed of travel of the platen. In some embodiments, the one or more processors are configured to, in response to determining that the amount of amperage being drawn by the electric motor has decreased, control the electric motor to maintain the set speed of travel of the platen.

In some examples, the incremental increase in the amount of amperage being drawn by the electric motor compared to the initial amperage drawn (e.g., during the forward stroke at the non-compaction stage) that is detected ranges from about 1% to about 500% (e.g., about 1% to about 50%, about 1% to about 100%, about 1% to about 150%, about 1% to about 200%, about 1% to about 250%, about 1% to about 300%, about 1% to about 350%, about 1% to about 400%, about 1% to about 450%, about 1% to about 500%, about 50% to about 100%, about 100% to about 200%, about 200% to about 300%, about 300% to about 400%, about 400% to about 500%, or more) increase in amperage. Incremental increases in the amount of amperage drawn by the electric motor indicates that the platen is at a compaction stage during its forward stroke. Thus, reducing the speed and/or cycle time when the platen is determined to be in a compaction stage may advantageously prevent the linear actuator from over-extending and the motor from overheating due to increased pressure.

Next, the method includes a step 210 in which the one or more processors are configured to determine, based on the data received from the encoder, that the position of the platen within the compaction chamber corresponds to a maximum threshold position and to determine that the amount of amperage being drawn by the electric motor corresponds to a maximum threshold amperage. The platen reaches the maximum threshold position when a maximum threshold amperage is drawn during a compaction cycle (e.g., when maximum compression has been reached). The maximum threshold amperage that indicates the platen has reached a threshold position corresponds to an increased amperage compared to the initial amperage drawn (e.g., during the forward stroke at the non-compaction stage). For example, the maximum threshold amperage is an amperage that is increased by about 1% to about 500% (e.g., about 1% to about 50%, about 1% to about 100%, about 1% to about 150%, about 1% to about 200%, about 1% to about 250%, about 1% to about 300%, about 1% to about 350%, about 1% to about 400%, about 1% to about 450%, about 1% to about 500%, about 50% to about 100%, about 100% to about 200%, about 200% to about 300%, about 300% to about 400%, about 400% to about 500%, or more) compared to the initial amperage drawn. If the one or more processors determine that the platen has not reached a threshold position and/or that the amount of amperage being drawn by the electric motor has not reached a threshold amperage, then the platen travel continues at the reduced speed. Reaching a threshold platen position and/or a threshold amperage indicates the platen is at a compaction stage during its forward stroke.

If the one or more processors determine that the platen has reached a maximum threshold position and/or that the amount of amperage being drawn by the electric motor has reached a maximum threshold amperage, then the one or more processors send instructions to an indicator on the vertical baler to indicate that a refuse bale has been generated, as illustrated in step 212. The one or more processors are configured to, in response to determining that: (i) the position of the platen within the compaction chamber corresponds to the threshold position and (ii) the amperage being drawn by the electric motor corresponds to the threshold amperage, cause an indicator on the vertical baler to indicate that a refuse bale has been generated. The indicator can be one or more of a visual alarm, an audible alarm, an indicator light, and a notification on a display coupled (wirelessly or via wire) to the one or more processors. The display can be a display monitor of a computer of a network (e.g., located remotely in a central office). In some examples, the display can be a display screen on the vertical baler. In some embodiments, the display is a display screen of a mobile device (e.g., a smartphone, a tablet, or the like) that is operatively connected with the vertical baler.

Furthermore, as shown in step 214, the one or more processors are configured to, in response to determining that the position of the platen within the compaction chamber corresponds to the threshold position and the amperage being drawn by the electric motor corresponds to the threshold amperage, cause a refuse bale to be ejected from the compaction chamber. In some embodiments, the step 214 is carried out after the indicator on the vertical baler indicates that a refuse bale has been generated. In some embodiments, the refuse bale is automatically ejected from the compaction chamber after the one or more processors determine the bale door is in an open position. In some embodiments, the bale door includes a position sensor that is communicatively coupled to the one or more processors. The position sensor can be configured to detect a position of the bale door (e.g., if the bale door is in an open or closed position) and transmit a signal indicative of the status of the bale door to the one or more processors. In some embodiments, the refuse bale is ejected from the compaction chamber after a user manually confirms the bale door is in an open position and after the user activates an ejection system (e.g., actuates an ejector). In some embodiments, the ejection system is a chain bale ejector. In some embodiments, a user manually actuates the chain bale ejector. In some embodiments, the ejection system is an automatic bale ejector. In some embodiments, the automatic bale ejector is engaged when the baler door is manually opened by a user. In some embodiments, the ejection system is operatively coupled to the platen.

Next, the method includes a step 216 in which the one or more processors send instructions to the VFD to increase the speed of platen travel during a return stroke (e.g., after the bale is ejected and platen is traveling up towards the home position). The one or more processors are further configured to raise the platen to a home position in response to determining that the position of the platen within the compaction chamber corresponds to the maximum threshold position and the amperage being drawn by the electric motor corresponds to the maximum threshold amperage. In some examples, the linear actuator is retracted when raising the platen to the home position. Step 216 is performed after the one or more processors determines the bale door is in an open position and after the position of the platen within the compaction center is verified to be at an end position (e.g., distal from the first end of the vertical baler). Increasing the speed of platen travel during a non-compaction stage (e.g., during a return stroke) (step 218) may advantageously reduce operating time and increase efficiency of compactor use. Next, the method includes a step 220 in which the finished bales are counted. For example, the one or more or more processors are further configured to count, record, store, and/or display the number of finished bales. In some embodiments, the one or more processors are instructed to count a finished bale when the bale door is determined to be in an open position and after sending instructions to the VFD to increase the speed of platen travel during a return stroke. Furthermore, the one or more or more processors are configured to count, record, store, and/or display the number of finished bales. For example, the one or more processors are instructed to count a completed compaction cycle when the bale door is determined to be in a closed position and after sending instructions to the VFD to increase the speed of platen travel during a return stroke.

Figure 16:
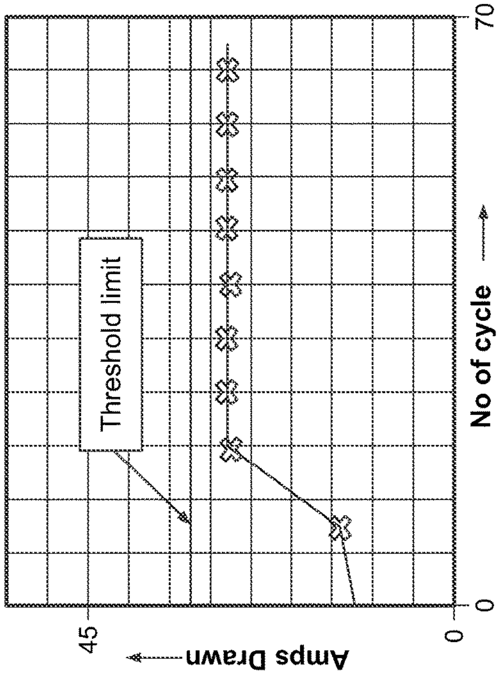
FIG. 16 is a graph illustrating the number of cycles with respect to the amperage drawn by the electric motor.
Figure 17:
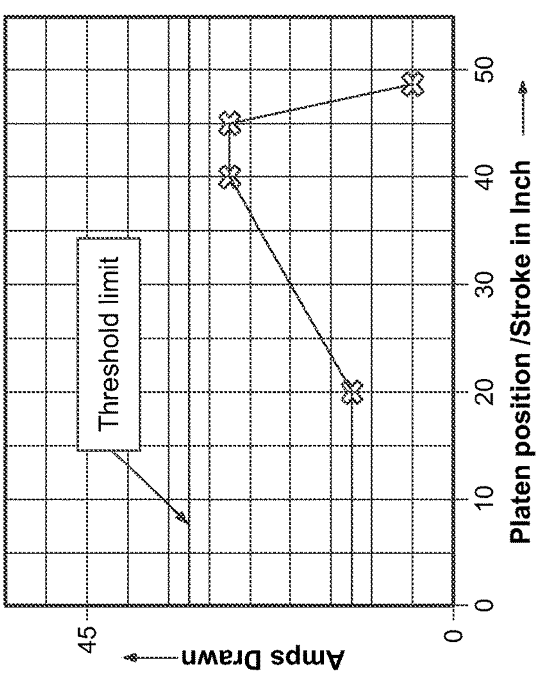
FIG. 17 is a graph illustrating the platen position with respect to the amperage drawn by the electric motor.
Figure 18:
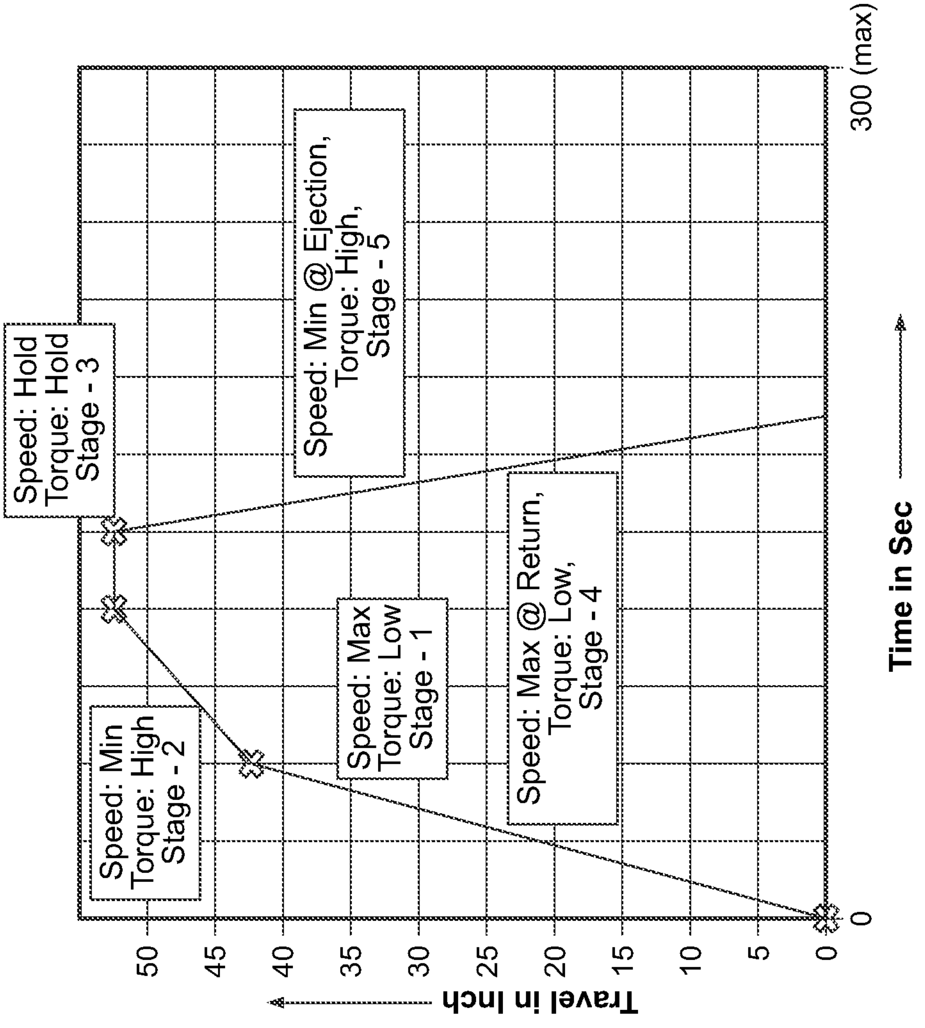
FIG. 18 is a graph illustrating the compaction cycle time with respect to the platen travel during the various stages of the compaction cycle.

FIGS. 16, 17, and 18 illustrate the detection and control of platen travel in the vertical balers of the disclosure. FIG. 16 shows the number of cycles with respect to the amperage drawn by the electric motor. The initial amperage drawn by the electric motor (i.e., when the number of cycle is zero) increases as the number of cycles increases until the amperage drawn reaches a constant value. FIG. 17 shows the platen position or strokes (measured in inches) with respect to the amperage drawn by the electric motor. FIG. 18 shows the platen travel distance in inches with respect to compaction cycle time (measured in seconds). Table 1 summarizes the five stages of the compaction cycle and their respective platen positions using the vertical balers described herein.

The electric motor current flow or amperage drawn is measured by a current transducer during operation. When the one or more processors send instructions to the VFD to increase the speed (e.g., revolutions per minute (RPM)) of the electric motor, the average current or average amperage drawn by the electric motor at a non-compaction stage increases with respect to platen position, as shown in FIG. 17, and platen travel increases with respect to time at Stage 1, as shown in FIG. 18. During the compaction stage (e.g., Stage 2), the one or more processors send instructions to the VFD to reduce the speed (e.g., RPM) of the electric motor. As the electric motor speed is reduced, a reduction in amperage is observed. A resistive force (e.g., opposite to the compaction force of the baler) results during the compaction of material, which further results in an increase of the amperage drawn by the electric motor, as compared to the initial and/or threshold amperage. In some embodiments, the increased amperage is compared to the initial amperage to determine the percent increase in amperage. In some embodiments, the increased amperage is compared to the threshold amperage to determine whether or not the increased amperage has exceeded the threshold amperage. In some embodiments, the threshold amperage is determined or set based on the type of refuse, the refuse density, and/or the refuse volume. As the resistive force begins to increase, the electric motor starts to draw more current or amperage as shown in FIG. 17. An advantage of the embodiments described herein may be the reduced risk of mechanical overload caused by a reduction in the speed at compaction zone. As shown in FIG. 16, to achieve a full, compacted bale, the amperage drawn incrementally increase at a certain cycle number and are maximized during the end portions of the compaction cycle.

Additionally, the vertical balers disclosed herein include diagnostic features to detect a platen jam. If the platen gets jammed during a non-compaction stage, the encoder sends one or more signals indicating a platen position to the one or more processors. In some embodiments, the encoder incrementally sends one or more signals to the one or more processors indicating the position of the platen. Simultaneously or before or after the encoder sends the one or more signals, the current transducer detects whether or not there is a maximum current or amperage being drawn by the electric motor and sends one or more signals to the one or more processors indicating the same. In response, the one or more processors send one or more signals (e.g., to a display such as a remote display, a display on-site, and/or a display on the vertical baler or to a remote computer) indicating an alarm (e.g., an audio alarm, a visual alarm, or both) and optionally, requesting a diagnosis of a condition of the vertical baler. The operation of the vertical baler is considered normal when the platen travel is equal to the set time. The

TABLE 1

Compaction cycle stages.

| Stroke/ Stage | Description | Platen Position |
|---|---|---|
| Forward stroke, non-compaction Stage 1 | One or more encoders detect platen position (e.g., the home position) and one or more processors instruct the VFD to increase the speed of the electric motor resulting in an increase in travel speed of the platen. | 0" to 20" |
| Forward stroke, compaction Stage 2 | The one or more processors detect incremental increase of current (amperage) during compaction and sends signal to VFD to reduce the speed of the electric motor, thereby reducing travel speed of platen. | 20" to 48" |
| Return stroke, Without Ejection Stage 3 | The one or more processors detect: 1) status of bale door (e.g., closed at this stage) (e.g., detected via a limit switch/sensor), 2) platen position (e.g., via encoder), and 3) a signal to move platen to home position (e.g., controlled or provided by user) and sends signal to VFD to increase the speed of the electric motor, thereby increasing travel speed of platen during return stroke. The one or more processors additionally count the number of cycles (e.g., first cycle). | about 48" (varies) to 0" |
| Finish Stroke, Bale Stage 4 | The one or more processors detect: 1) maximum current (amperage) drawn with respect to a set limit (e.g., threshold amperage) and 2) platen position (e.g., detected via encoder) and determine if bale is a finished bale. | 30" |
| Return stroke, Finish bale Ejection Stage 5 | The one or more processors detect: 1) status of bale door (e.g., open at this stage) (e.g. detected via a limit switch/sensor), 2) platen position (e.g., via encoder), and 3) a signal to move platen to the home position (e.g., controlled or provided by user). The one or more processors additionally count the number of finished bales (e.g., a first finished bale). | 30" to 0" |

one or more processors can receive one or more signals from the encoder and/or current transducer indicating the operation of the vertical baler is operating under normal conditions. In some embodiments, the one the one or more processors send one or more signals indicating (e.g., to a display such as a remote display, a display on-site, and/or a display on the vertical baler or to a remote computer) indicating the vertical baler is operating under normal conditions.

Figure 4:
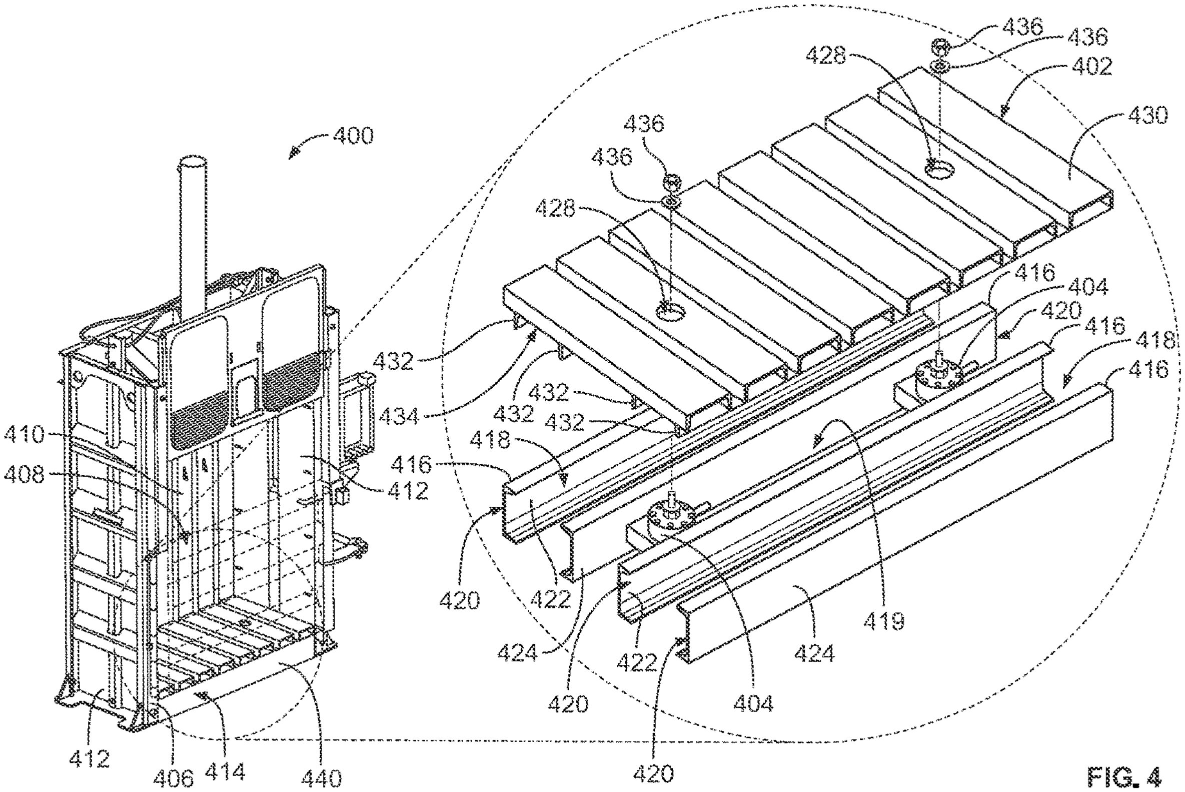
FIG. 4 is an enlarged partial exploded view of a vertical baler including a floating bed and two load cells.
Figure 5:
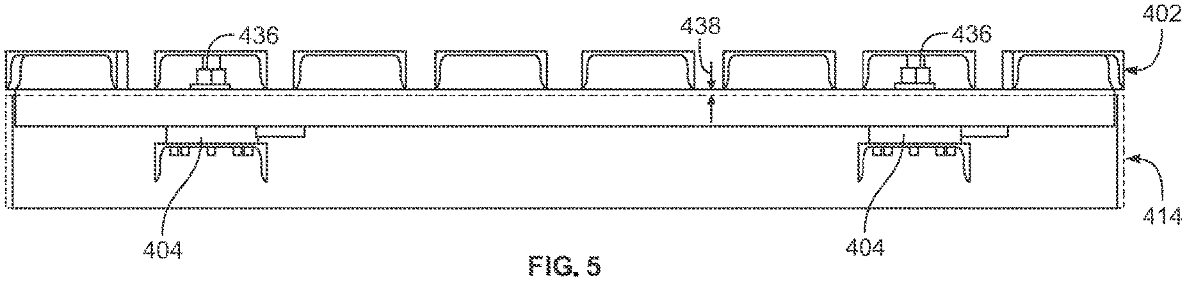
FIG. 5 is a partial front cross-sectional view of the floating bed and load cells of FIG. 4.
Figure 6:
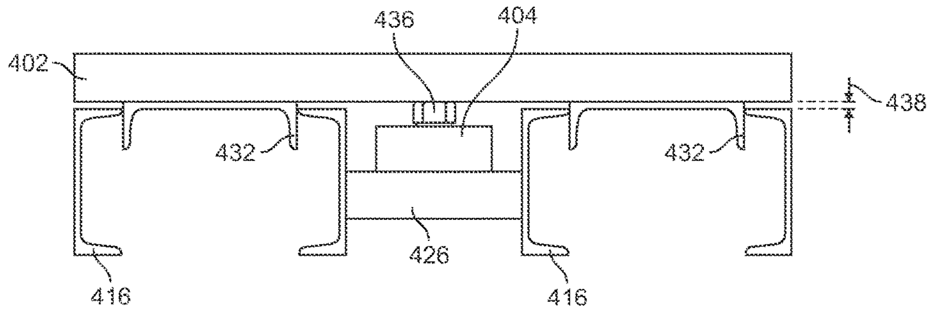
FIG. 6 is a side view of the floating bed and load cells of FIG. 4.

FIGS. 4-6 illustrate a vertical baler 400 including a weighing system further including a floating bed 402 configured to receive refuse, two load cells 404 configured to measure a force applied to the floating bed, and one or more processors. Referring to FIG. 4, the vertical baler 400 includes a frame 406 defining a compaction chamber 408 and a platen configured for vertical travel within the compaction chamber 408 to compact refuse contained within the compaction chamber. The frame 406 has a back wall 410 extending orthogonally between and fixedly coupled to a pair of opposing side walls 412. The frame 406 includes a floor 414 fixedly coupled to the back wall 410 and the side walls 412. The floor 414 of the compaction chamber 408 is formed by two pairs of C-shaped beams 416 having a web 420. The inner surfaces 422 of the web 420 define a pair of channels 418 and a channel 419 extending along a base 440 of the frame 406. A pair of mounting brackets 426 is fixedly coupled to the outer surfaces 424 of the web 420 within a channel 419. Each load cell 404 is coupled (e.g., fastened via one or more fasteners) to each mounting bracket 426. The floating bed 402 includes plates 430 and inverted C-shaped guide beams 432 extending from a bottom surface 434 of the plates 430. The inverted C-shaped guide beams 432 are configured to engage the C-shaped beams 416 when the floating bed is mounted on the floor 414 of the frame 406. The floating bed 402 is further positioned on, supported by, and coupled to the load cells 404 by fasteners 436 that are aligned and inserted through a pair of holes 428 defined by the plates 430. The fastening components described herein are merely exemplary and not intended to limit the present disclosure in any way. Other embodiments are contemplated to be within the scope of the present disclosure. For example, other contemplated embodiments include coupling the floating bed to the load cells via alternate mounting arrangements.

FIG. 5 shows a partial front cross-sectional view of the floating bed 402 coupled to the load cells 404 and floor 414 with fasteners 436. A gap 438 is defined by opposing surfaces of the floating bed and the floor 414 and is configured to be adjusted by fasteners 436. For example, a user can decrease the gap 438 by further tightening of the fasteners 436. FIG. 6 shows a side view of the floating bed 402 coupled to the load cell 404 via the fastener 436. The load cell 404 is further coupled to the mounting bracket 426. The inverted C-shaped guide beams 432 are configured to stabilize and guide the floating bed 402 by engaging with the C-shaped beams 416, as shown in FIG. 6.

When in use, placement of refuse on the floating bed causes the floating bed to lower within the frame and apply a force to the load cell. The load cell is then configured to measure a total force applied to the floating bed. The weighing system further includes one or more processors configured to perform operations including receiving data from the load cell indicating a total force applied to the floating bed, and determining, based on the data received from the load cell indicating a total force applied to the floating bed, a weight of refuse positioned on the floating bed. The step of determining the weight of refuse positioned on the floating bed includes receiving, by the one or more processors, data indicating an amount of force being applied by the platen, and calculating, by the one or more processors, a difference between the total force applied to the floating bed and the amount of force being applied by the platen.

The vertical baler 400 further includes a weight indicator, and the one or more processors can further be configured to cause the weight indicator to display at least one of the weight of refuse positioned on the floating bed or the amount of force being applied by the platen. The weight indicator can be one or more of a visual alarm, an audible alarm, an indicator light, and a notification on a display coupled (wirelessly or via wire) to the one or more processors. The display, as discussed above, can be a display monitor of a computer of a network (e.g., located remotely in a central office). In some examples, the display can be a display screen on the vertical baler. In some embodiments, the display is a display screen of a mobile device (e.g., a smartphone, a tablet, or the like) that is operatively connected with the vertical baler.

A vertical baler may be substantially similar in construction and function in several aspects to the vertical baler 400 discussed above but can include four load cells arranged in a different configuration as the configuration described above. In some embodiments, a vertical baler may have four load cells. For example, the four load cells may be coupled to the frame within two channels that are different than the channel containing the load cells of vertical baler 400 discussed above.

Figure 7:
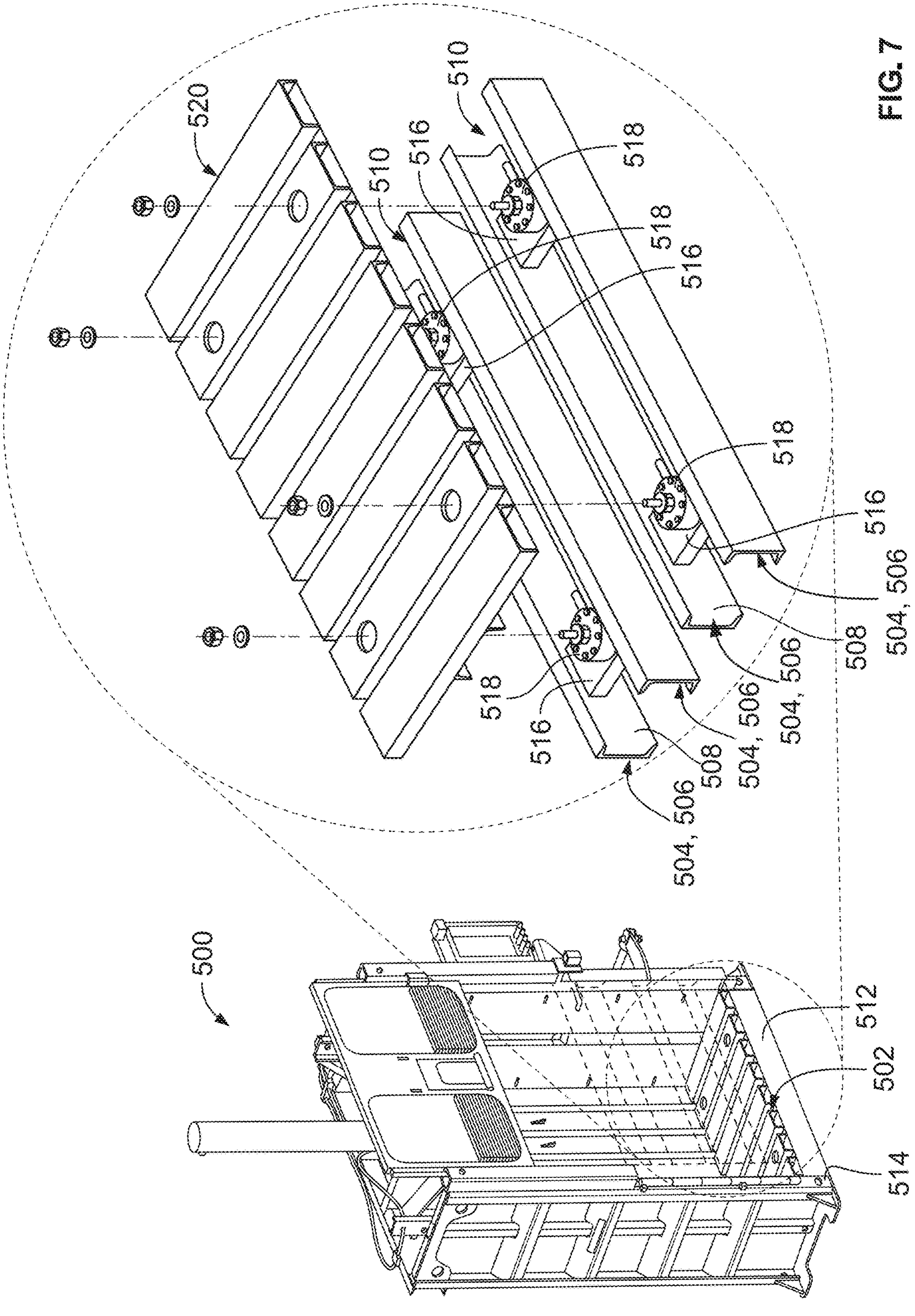
FIG. 7 is an enlarged partial exploded view of a vertical baler including a floating bed and four load cells.
Figure 8:
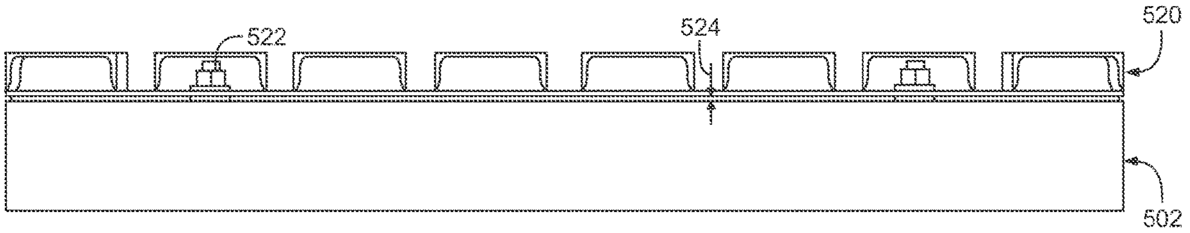
FIG. 8 is a partial front cross-sectional view of the floating bed and load cells of FIG. 6.
Figure 9:
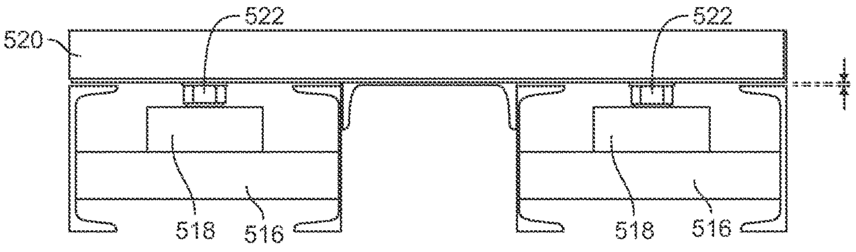
FIG. 9 is a side view of the floating bed and load cells of FIG. 6.

FIGS. 7-9 illustrate a vertical baler 500 having four load cells 518. Referring to FIG. 7, the vertical baler 500 has a frame 514 and a floor 502 formed by two pairs of C-shaped beams 504 having a web 506. The inner surfaces 508 of the web 506 define a pair of channels 510 extending along a base 512 of the frame 514. Two pairs of mounting brackets 516 are fixedly coupled to the inner surfaces 508 of the web 506. Each pair of mounting brackets is disposed within a channel 510. The vertical baler 500 further includes four load cells 518 coupled (e.g., fastened via one or more fasteners) to the mounting brackets 516.

FIG. 8 shows a partial front cross-sectional view of the floating bed 520 coupled to the load cells and to the floor 502 with fasteners 522. A gap 524 is defined by opposing surfaces of the floating bed 520 and the floor 502 and is configured to be adjusted by fasteners 522. For example, a user can decrease the gap 524 by further tightening of the fasteners 522. FIG. 9 shows a side view of the floating bed 520 coupled to the load cells 518 via the fasteners 522. The load cells 518 are further coupled to the mounting brackets 516.

A vertical baler may be substantially similar in construction and function in several aspects to the vertical balers 400, 500 discussed above, but can include a spring coupled to the floating bed and positioned between the floating bed and the load cell. In some embodiments, the spring is configured to compress during compression of refuse on the floating bed by the platen. In some embodiments, the spring and load cells may be coupled to portions of the frame that are different than the portions of the frame to which the load cells of vertical balers 400, 500 are coupled.

Figure 10:
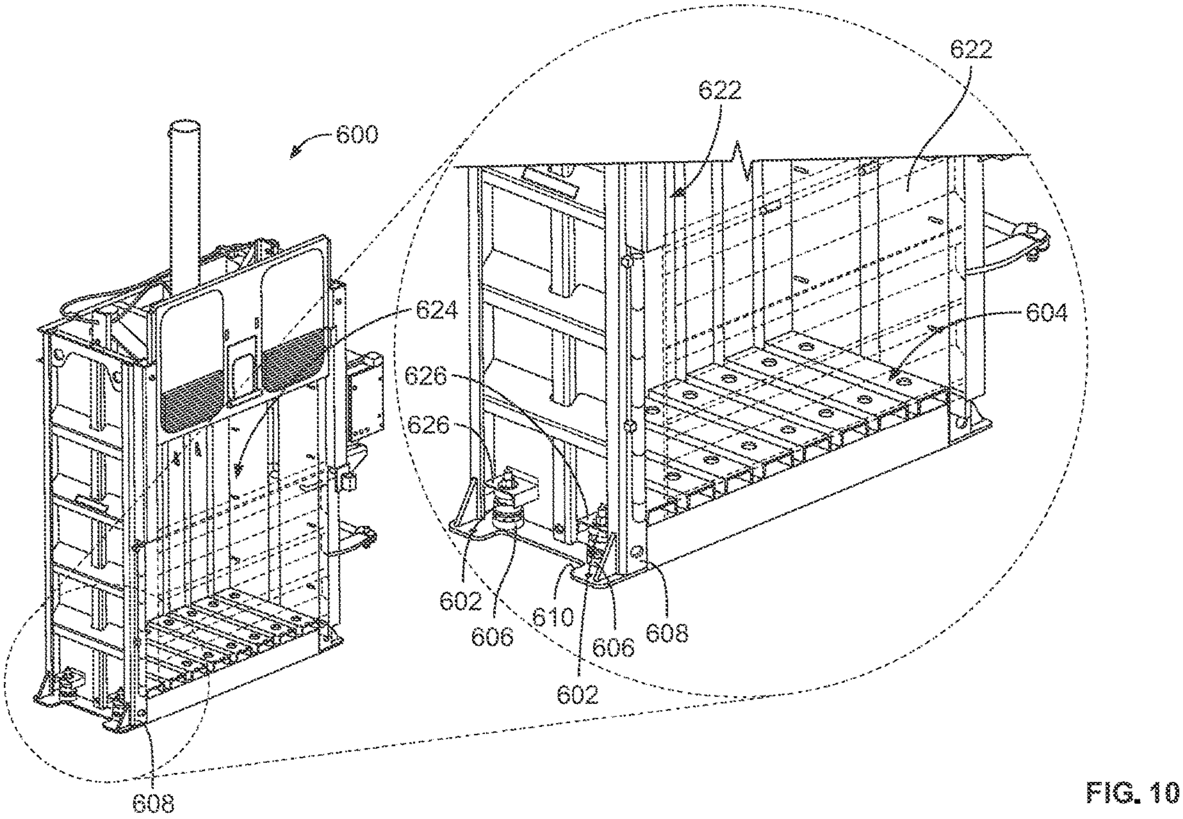
FIG. 10 is an enlarged partial exploded view of a vertical baler including load cells and springs.
Figure 11:
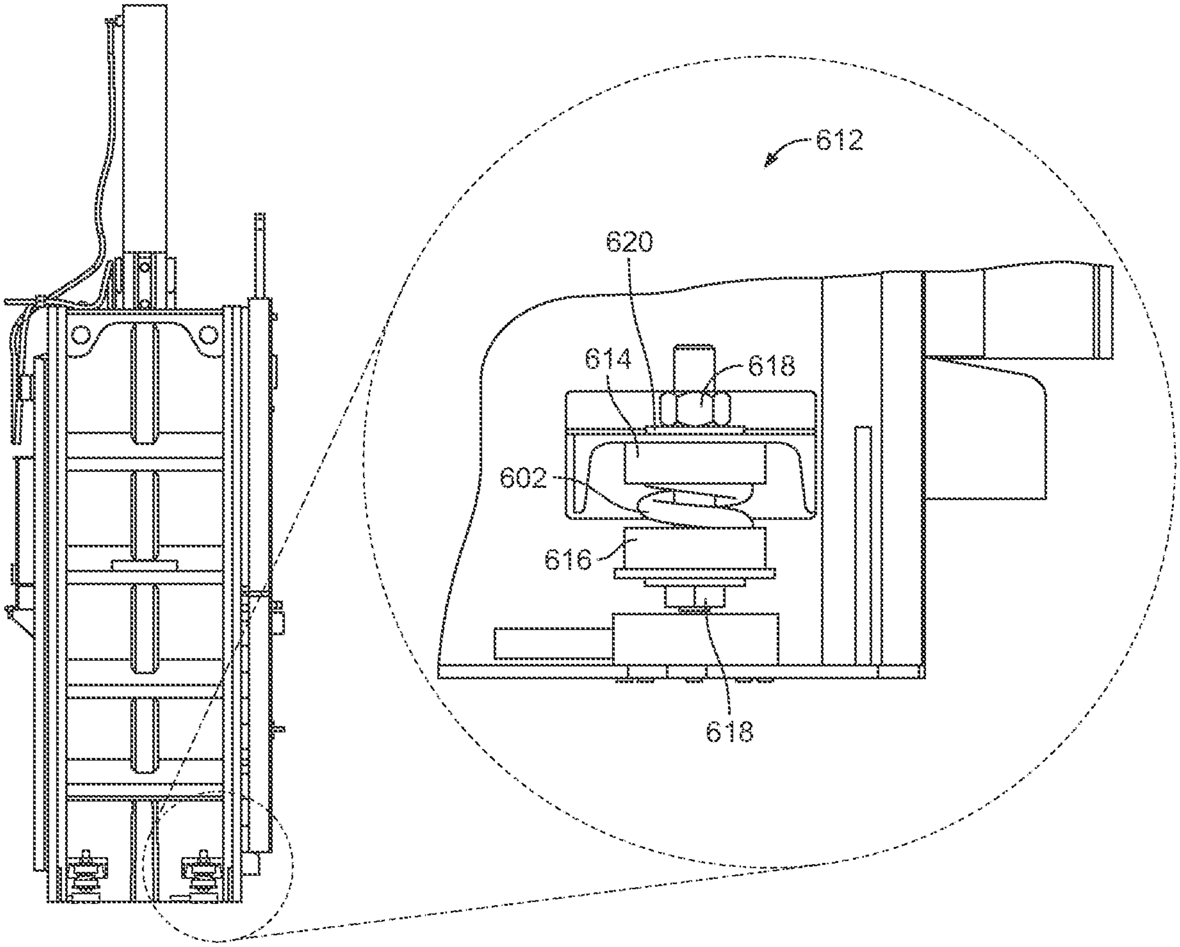
FIG. 11 is an enlarged partial view of a spring of FIG. 9.

FIGS. 10 and 11 illustrate a vertical baler 600 having springs 602 coupled to the floating bed 604 and positioned between the floating bed 604 and the load cell 606. Referring to FIG. 10, the vertical baler 600 has a frame 608. A support plate 610 is fixedly coupled to and extends outwardly from a side of the frame 608. The support plate 610 further defines an opening near each corner of the vertical baler 600. The openings are configured to receive the springs 602; thus, the vertical baler 600 includes four springs 602 coupled to load cells 606, each spring 602 and load cell 606 disposed near a corner of the vertical baler 600. The floating bed 604 is disposed between inner side walls 622 of the compaction chamber 624 and coupled (e.g., via fasteners) to a side plate 626 that protrudes outwardly from the inner side walls 622 into a space exterior to the compaction chamber 624. FIG. 11 shows an enlarged partial view of a spring assembly 612. The spring 602 is mounted between a top spring retainer 614 and bottom spring retainer 616. A pair of fasteners 618 secures the top and bottom spring retainers 614, 616. Adjustment of pre-loading can be made by adjusting a spacer 620 and the fasteners 618.

The vertical baler 600 further includes one or more processors configured to perform operations including receiving a signal from the load cell indicating an amount of force being applied to the load cell by the spring. The amount of force being applied to the load cell by the spring corresponds, in turn, to a weight of refuse positioned on the floating bed. In some embodiments, the vertical baler can include a mechanical stop coupled to a base of the frame and configured to prevent damage to the load cell.

A vertical baler may be substantially similar in construction and function in several aspects to the vertical balers 100, 400, 500, 600 discussed above, but can include a laser projection system coupled to the frame. In some embodiments, the laser projection system may be configured to project a visual indicator onto a surface (e.g., a floor). A vertical baler including these features can advantageously indicate to a user safety warnings using visual indicators.

Figure 12:
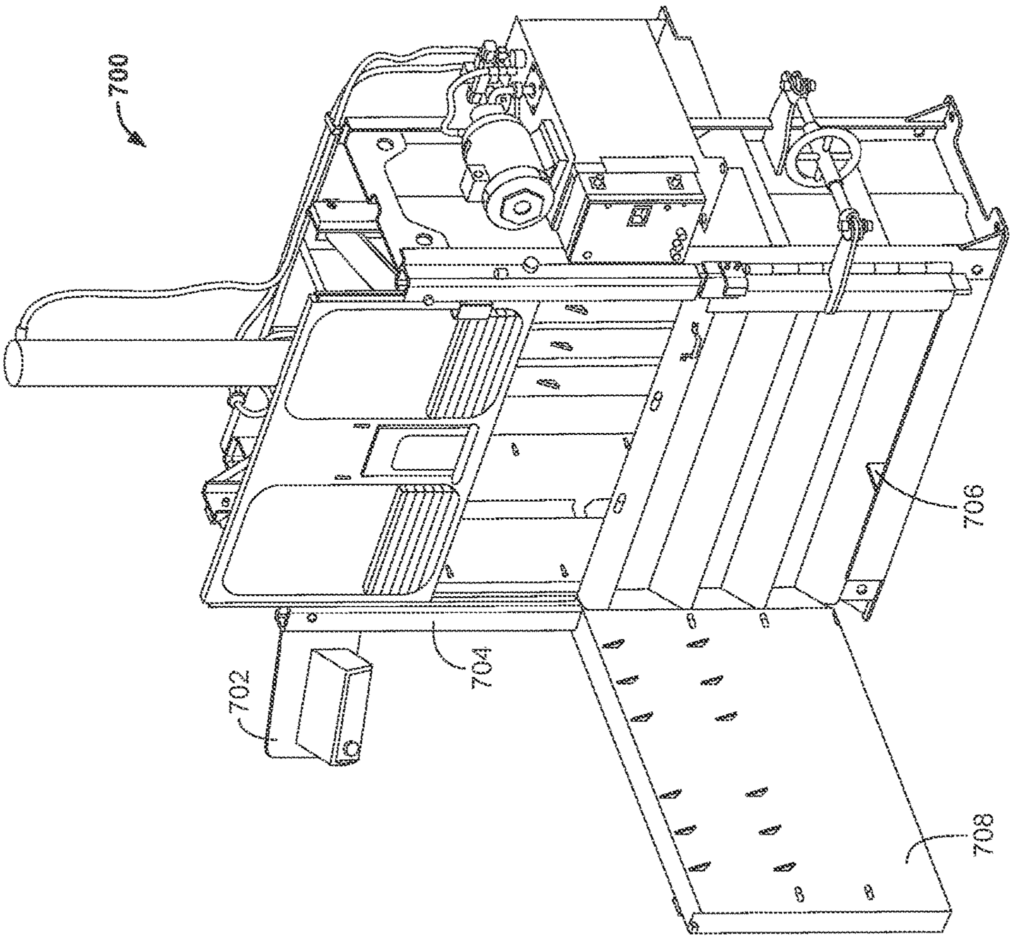
FIG. 12 is a front perspective view of a vertical baler including a laser projection system.
Figure 13:
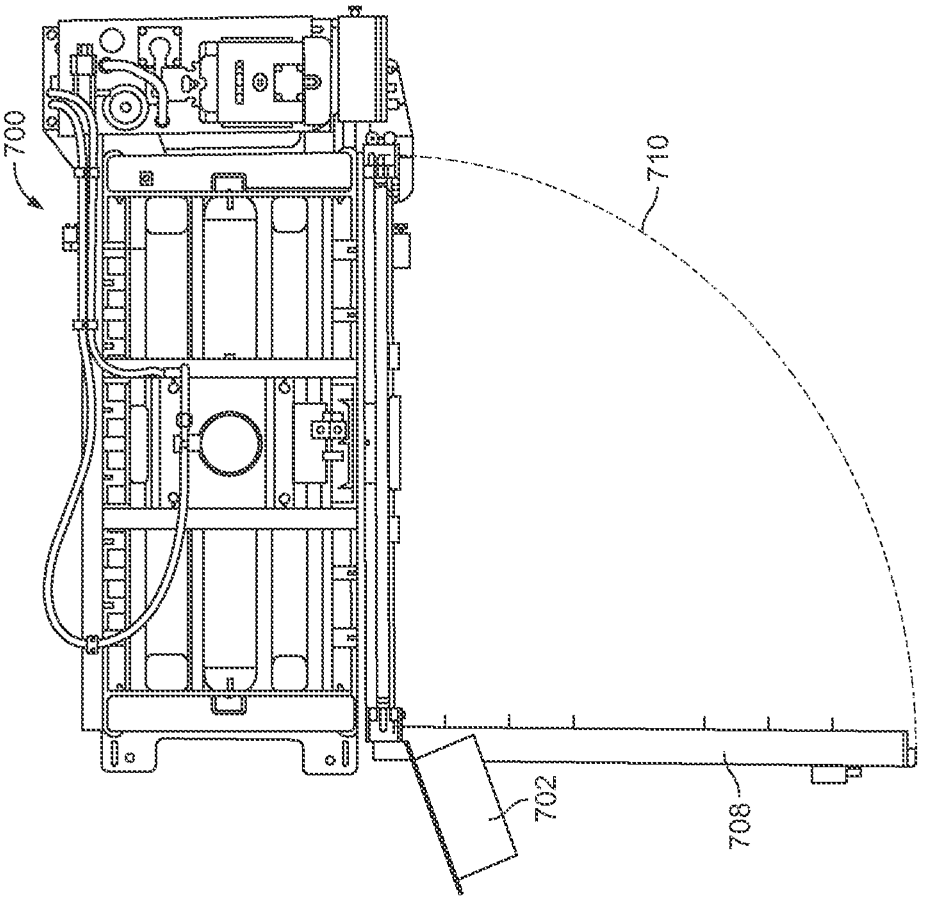
FIG. 13 is a top view of the vertical baler of FIG. 11 projecting a curved beam.
Figure 14:
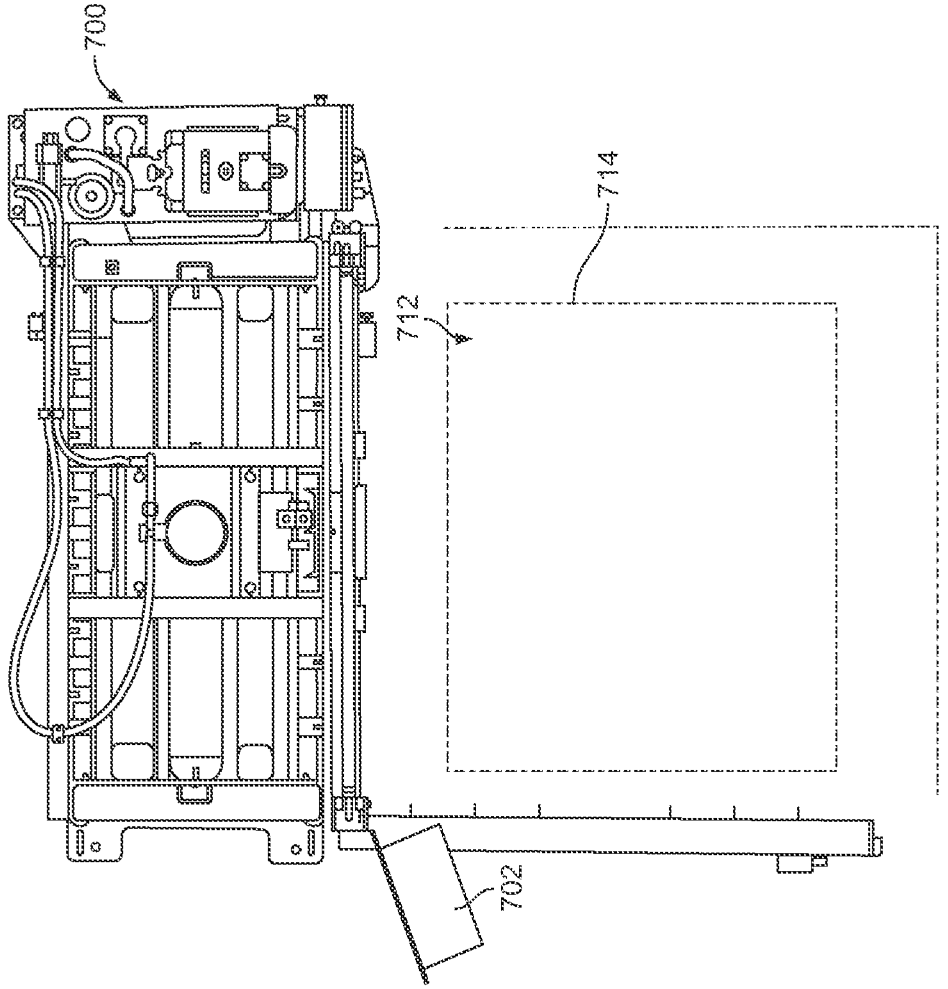
FIG. 14 is a top view of the vertical baler of FIG. 11 projecting a rectangular shape.
Figure 15:
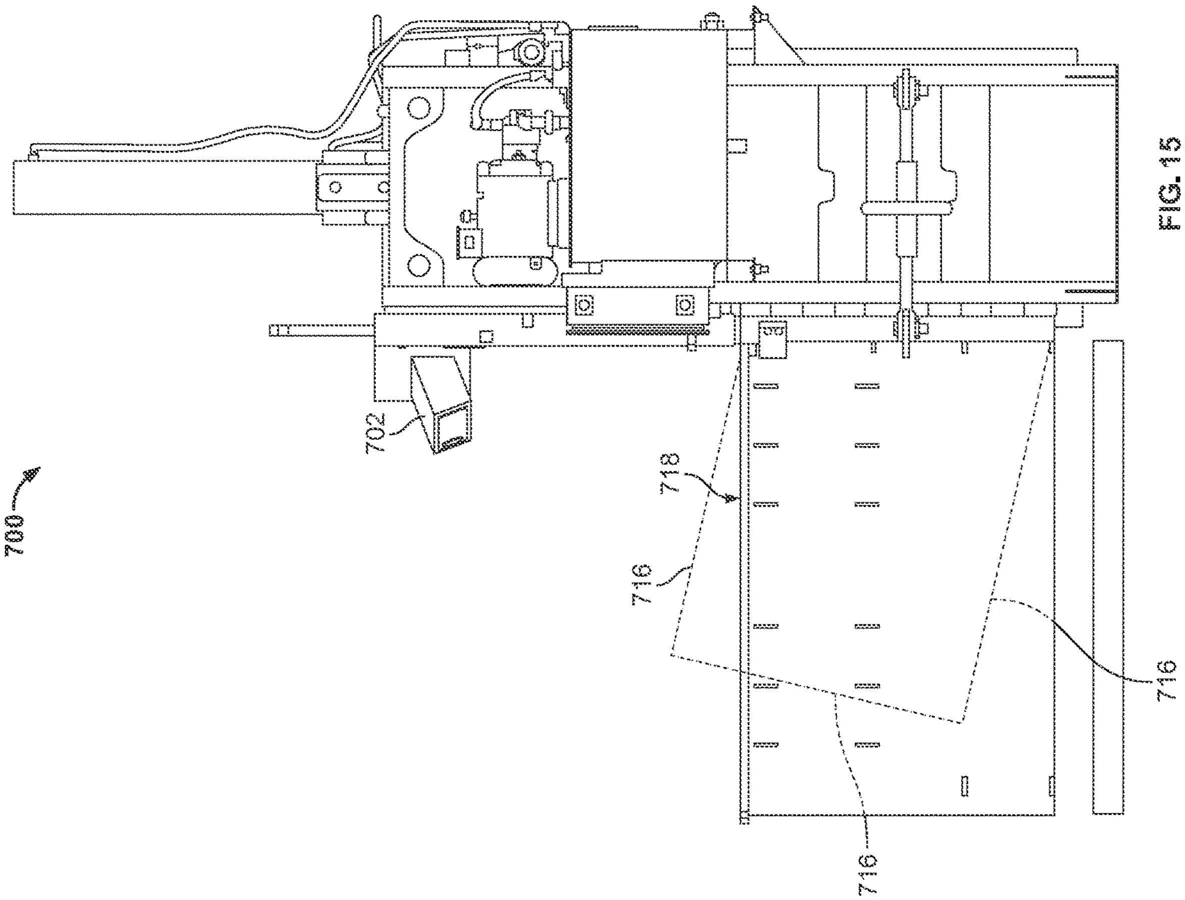
FIG. 15 is a top view of the vertical baler of FIG. 11 projecting lines indicating a clear area.

FIGS. 12-15 illustrate a vertical baler 700 including a laser projection system 702. Referring to FIG. 12, the vertical baler 700 includes a frame 704 defining a compaction chamber 706. The vertical baler 700 includes a door 708 mounted on the frame 704. The door 708 covers at least a portion of the compaction chamber 706 when in a closed position. The laser projection system 702 is coupled to the frame 704 and is configured to project a visual indicator onto a surface proximate the vertical baler 700 when the door is in an open position. For example, as shown in FIG. 13, the laser projection system 702 is configured to project a curved beam 710 onto a surface proximate the vertical baler 700 indicating a path of the door between the open position and the closed position. In another example, as shown in FIG. 14, the laser projection system 702 is configured to project a rectangular shape 714 on the surface 712 proximate the vertical baler 700 corresponding to a proper position for placing a pallet to receive a refuse bale being ejected from the compaction chamber. In some embodiments, the laser projection system 702 is configured to project a pallet logo within the rectangular shape 714. FIG. 15 shows the laser projection system 702 is further configured to project one or more lines 716 outside the rectangular shape 714. The lines 716 indicate a clear area 718.

The vertical baler 700 further includes one or more processors configured to cause the laser projection system to project the visual indicator onto the surface proximate the vertical baler when the door is in the open position. In some embodiments, the vertical baler further includes a limit switch communicably coupled to the one or more processors and configured to detect when the door is in the open position. In some embodiments, the one or more processors are configured to cause the laser projection system to project the visual indicator onto the surface proximate the vertical baler in response to receiving a signal from the limit switch indicating that the door is in the open position. In some embodiments, the vertical baler further includes a motion sensor configured to detect a presence of a person within a threshold distance of the door. In some embodiments, the one or more processors are configured to cause the laser projection system to project the visual indicator onto the surface proximate the vertical baler in response to determining that the door is in the open position and receiving a signal from the motion sensor indicating that a person is within the threshold distance of the door. In some embodiments, the laser projection system is configured to project a hazard logo onto the surface proximate the vertical baler. In some embodiments, the laser projection system is configured to project one or more colors to indicate one or more hazard warnings. The hazard logo and/or hazard warnings can warn a user of baler operation, for example. In some embodiments, the laser projection system includes one or more lasers. In some embodiments, the vertical baler further includes an audible alarm that is configured to be activated when the laser projection system projects one or more visual indicators.

While the above-discussed vertical balers 100, 400, 500, 600, 700 have been described and illustrated with respect to certain dimensions, shapes, arrangements, configurations, material formulations, and methods, in some embodiments, a vertical baler that is otherwise substantially similar in construction and function to vertical balers 100, 400, 500, 600, 700 may include one or more dimensions, shapes, arrangements, configurations, and/or materials formulations that are different from the ones discussed above or may be used with respect to methods that are modified as compared to the methods described above. For example, while the vertical balers 400, 500, 600 have been described and illustrated as including two or four load cells, in some embodiments, the vertical baler includes one, three, five, or more load cells.

While the vertical baler 100 has been described and illustrated as including an electrical linear drive system including a pair of linear accelerators, in some embodiments, a vertical baler that is otherwise substantially similar in construction and function to the vertical baler 100 may include one, three, or more linear accelerators.

While the above-discussed vertical balers 100, 400, 500, 600, 700 have been described and illustrated with respect to certain dimensions, shapes, arrangements, configurations, material formulations, and methods, in some embodiments, a vertical baler that is otherwise substantially similar in construction and function to vertical balers 100, 400, 500, 600, 700 may include one or more combinations of the features of vertical balers 100, 400, 500, 600, 700. For example, in some embodiments, a vertical baler may have an electrical linear drive system and one of a floating bed and load cell configuration of vertical balers 400, 500, and 600. In some embodiments, a vertical baler may have an electrical linear drive system and a laser projection system of vertical baler 700. In some embodiments, a vertical baler may have an electrical linear drive system, one of a floating bed and load cell configuration of vertical balers 400, 500, and 600 and a laser projection system of vertical baler 700. In some embodiments, a vertical baler may have one of a floating bed and load cell configuration of vertical balers 400, 500, and 600 and a laser projection system of vertical baler 700. A vertical baler including these features can advantageously allow a user to detect and control platen travel, measure a weight of a bale in real time, and/or project visual indicators to ensure the safety of a user.

A number of embodiments of the invention have been described. Nevertheless, it will be understood that various modifications may be made without departing from the spirit and scope of the invention. Accordingly, other embodiments are within the scope of the following claims.

What is claimed is:

1. A vertical baler, comprising:
- a frame defining a compaction chamber;
- a platen configured for vertical travel within the compaction chamber to compact refuse contained within the compaction chamber;
- a linear actuator coupled to the platen and configured to raise and lower the platen within the compaction chamber;
- an electric motor coupled to the linear actuator and configured to control extension and retraction of the linear actuator;
- an encoder coupled to the electric motor and configured to measure rotation of the motor; and
- one or more processors configured to perform operations comprising:
  - receiving, from the encoder, data indicating rotations of the electric motor;
  - determining, based on the data indicating rotations of the electric motor, a position of the platen within the compaction chamber;
  - receiving data indicating an amount of amperage being drawn by the electric motor; and
  - determining, based on the data received from the encoder, that the position of the platen within the compaction chamber corresponds to a threshold position;
  - determining that the amount of amperage being drawn by the electric motor corresponds to a threshold amperage; and
  - in response to determining that the position of the platen within the compaction chamber corresponds to the threshold position and the amperage being drawn by the electric motor corresponds to the threshold amperage, causing a refuse bale to be ejected from the compaction chamber.

2. The vertical baler of claim 1, wherein the operations further comprise raising the platen to a home position within the compaction chamber in response to determining that the position of the platen within the compaction chamber corresponds to the threshold position and the amperage being drawn by the electric motor corresponds to the threshold amperage.

3. The vertical baler of claim 1, wherein raising the platen to a home position within the compaction chamber comprises retracting the linear actuator.

4. The vertical baler of claim 1, wherein
- the vertical baler further comprises a bale door coupled to the frame; and
- causing a refuse bale to be ejected from the compaction chamber comprises controlling the bale door to be positioned in an open position.

5. The vertical baler of claim 1, wherein the operations further comprise:
- in response to determining that (i) the position of the platen within the compaction chamber corresponds to the threshold position and (ii) the amperage being drawn by the electric motor corresponds to the threshold amperage, causing an indicator on the vertical baler to indicate that a refuse bale has been generated.

6. The vertical baler of claim 1, wherein:
- the operations further comprise determining, based on the data indicating the amount of amperage being drawn by the electric motor, that the amperage being drawn by the electric motor has increased by a predetermined amount over a predetermined amount of time; and in response, controlling the electric motor to reduce a speed of travel of the platen within the compaction chamber in response to determining that the amperage being drawn by the electric motor has increased by the predetermined amount over the predetermined amount of time.

7. The vertical baler of claim 6, wherein:

the vertical baler further comprises a variable frequency drive coupled to the linear actuator and configured to control a speed of movement of the platen within the compaction chamber; and reducing the speed of travel of the platen within the compaction chamber comprises causing the variable frequency drive to reduce a rate of extension of the linear actuator.

* * * * *